Patented Apr. 5, 1932

1,852,207

UNITED STATES PATENT OFFICE

HARRY N. HOLMES, OF OBERLIN, OHIO

PRODUCTION OF UNIFORM CATALYTIC MIXTURES

No Drawing.  Application filed January 7, 1930.  Serial No. 419,201.

This invention relates to catalysts, such as are used in the catalytic oxidation of sulfur dioxide to sulfur trioxide in the contact sulfuric acid process, although these catalysts are useful in connection with other processes and for other purposes, and the manufacture of sulfuric acid is but one example of such use.

The object of the invention, very briefly stated, is to provide a more efficient catalyst by more thorough and uniform dissemination or distribution of the catalytic material throughout the catalyst support.

Present practice, to some extent, is replacing platinum as a catalyst for these purposes with a class of materials which, for convenience and not in any strict technical sense, may be termed zeolites, to wit, complex metal silicates, many of them containing for this special purpose more or less rare metals, such as vanadium and the like. Instances of such zeolite catalysts are described in several patents, such as Jaeger 1,675,309, granted June 26, 1928, and 1,694,123, granted December 4, 1928; and to Jaeger and Bertsch, 1,657,754, granted January 31, 1928; and others referred to therein.

A typical method of forming a catalyst by such processes so as to incorporate a vanadium compound into the final product consists in mixing a solution of ferric chloride or ferric sulfate with a solution of potassium vanadate in such quantities that ferric vanadate is precipitated either alone or with other materials. The precipitate is then mixed with a solution of a silicate, such as potassium or sodium silicate, further precipitation or the production of a gel being obtained by the addition of an acid or any suitable precipitating substance. All such methods, in which one precipitate is first produced and another precipitate thereafter is produced alongside of the first, as it were, have the disadvantage that a homogeneous material cannot be produced.

The present invention, again referring briefly to the aforesaid typical example, aims to provide a more even distribution or dissemination of, for example, compounds of iron and vanadium, in a silicious or other suitable support by adding, for example, ferric vanadate, previously peptized into solution, to a solution of the alkali silicate, and in one operation producing a single precipitate containing both the catalyst and its support.

To that end I produce an intimate mixture of the catalytic support, usually hydrated silica or silicates, with the desired metallates of active catalytic value and more or less hydrated metallic oxides, by adding, for example, to one or more metallates, such as a soluble vanadate, a solution of suitable salts of a metal or metals, of which the metallates are desired, such as ferric chloride. The first addition of metal salt solution, as ordinarily is the case, produces a precipitate, which is the metallate of the metal, ferric vanadate for example, but it is a peculiar property of these metallates that in many cases they are colloidally dispersed or made soluble by an excess of a suitable metal salt, which, if not excess of the original precipitating salt or salts, may be some other metal salt. In the present instance the addition of an excess of the same initial salt, ferric chloride, will peptize the precipitated ferric vanadate, forming a colloidal solution thereof. In other specific instances, an excess of a metal salt may produce a true solution of molecular dispersion, for which reason the word "solution" here and in the claims appended hereto should be understood to refer broadly, not only to either molecular or colloidal dispersions, but to any and all equivalent conditions, whatever they may be or however characterized, which produce the results of this invention, to wit, the production of the final intimate mixture in situ instead of the production of two separate precipitates more or less crudely mixed. In any event, the metallate is first precipitated by a metal salt and is then peptized by a metal salt, as stated, and the colloidal or other solution of peptized vanadate, ferric vanadate in this instance, is added to a silicate solution, such as potassium or sodium silicate, which reacts with the peptizing salt to produce a precipitate of the catalyst, containing in this instance both iron and vanadium completely disseminated or distributed throughout the entire mass and far more intimately associated with the remaining components of the mass than when the precipitates are separately formed. The product of the mixture of the peptized metallate with the soluble silicate of course is a gel, which is filtered or otherwise separated from the remaining liquid and is pressed or dried and broken up to the customary form in which such catalysts are used and is then ready for use. In the form described it corresponds somewhat to one of the so-called artificial zeolites or double silicates referred to in the aforesaid patents, but the character of the material is strikingly different in its complete dissemination of the catalytic material throughout all of the microscopic and submicroscopic pores of the honeycomb structure of the gelatinous mass.

In a general way, catalysts prepared by this process may be divided into three groups, as follows:

A. A metal salt added to a metallate produces a precipitate which is capable of being peptized by addition of an excess of the precipitating salt. Ferric chloride and potassium vanadate are an instance of this class in which the ferric vanadate is colloidally dispersed in an excess of the ferric chloride solution.

B. A metal salt added to a metallate produces a precipitate which is only partially colloidally dispersible in an excess of the same precipitating salt, but is completely peptized by some other metal salt. For example, a precipitate may be formed from a metallate by manganous chloride and the precipitate may be only partially peptized by manganous chloride, but completely peptized by solutions of ferric chloride, aluminum sulfate, aluminum chloride, chromium chloride, or the like.

C. A metal salt added to a metallate may produce a precipitate which is not at all peptized by an excess of the precipitating agent but is completely peptized by some other metal salt. In other words, the precipitate may be formed by cupric chloride, for example, and be unaffected by an excess thereof, but be completely peptized by an excess of solutions of some other salt, such as those of ferric iron, aluminum, chromium or the like before mentioned.

My invention contemplates all three of the above classes and includes all methods where the initial precipitate may be peptized by an excess of a metal salt or equivalent material so that a colloidal or other solution of the metal metallate, instead of the precipitate of the metallate, may be added to the silicate solution for production of one, and only one, intimately mixed precipitate as the product. In order to increase the percentage of silica in the final product it is often desirable to use an excess of the peptizing salt, such as ferric chloride, because this excess will itself react in the soluble silicates to form additional precipitate.

The invention also relates not only to compounds of vanadium in which the vanadium is in its highest state of valance, but also to compounds of vanadium in its lower states of valance, such as vanadites. For convenience and to avoid the necessity of distinctions on the question of valance, all of the metallates formed by vanadium, such as vanadates, vanadites, etc., are herein referred to as vanadium-type metallates. Other metal salts which may be used in place of iron chloride are barium chloride, cadmium nitrate, the salts of copper, silver, gold, beryllium, zinc, strontium, magnesium, zirconium, cobalt, nickel, manganese, etc.

To further explain the invention, it will be illustrated by certain specific examples, which, while illustrating particularly effective processes and compounds for certain purposes, are not to be understood in any sense of limitation of the invention, but are merely included for purposes of illustration.

*Example 1*

1. Prepare a solution of $KVO_3$ each c. c. of which contains 0.091 grams of vanadium.
2. 100 grams of $FeCl_3.6H_2O$ are dissolved in 200 c. c. of water.
3. 100 c. c. of commercial sodium silicate (density approximately 1.375) is diluted to one liter.

54 c. c. of solution No. 1 are added to 276 c. c. of water and 180 c. c. of solution No. 2 are added to this. Shake or stir the mixture thoroughly until the precipitate which first forms is completely peptized. 283 c. c. of the peptized ferric vanadate solution are then added slowly with constant stirring to one liter of solution No. 3. The precipitate which forms is allowed to settle for several hours and is filtered on cheesecloth or some such material. The precipitate is dried slowly at room temperature until the gel is of sufficient hardness so that it can be removed from the filter cloth. Then the gel is placed on wire trays and allowed to dry to a moisture content of 30 to 50%. The gel is ground to particles the size of wheat grains and then heated in a stream of air at 200° to 400° C. for several hours. The ground gel makes an excellent contact mass for the production of sulfuric acid. 96 to 97% conversion of sulfur dioxide to sulfur trioxide has been obtained with this catalyst.

*Example 2*

Solutions 1, 2 and 3 are prepared in exactly the same manner as in Example 1.

4. Dissolve 80 grams of $CuSO_4.5H_2O$ in 1000 c. c. of water.

Add solution 4 of $CuSO_4$ to $KVO_3$ solution until all of the copper has been precipitated. Then add to this precipitate, with vigorous stirring, FeCl$_3$ solution until the precipitate has been completely peptized. This solution is then added to sodium silicate solution until the resulting mixture is neutral to litmus. The precipitate produced is filtered, dried and activated in a manner similar to that outlined in Example 1. The dried activated gel has excellent catalytic properties.

The invention is not limited to any particular or special theory, but is designed to cover the practical uses and effects of the materials involved.

What I claim is:

1. The method of preparing a catalyst, consisting in mixing together solutions of a vanadium-type metallate and the salt of a metal other than an alkali metal to form a precipitate of the metallate of the metal, peptizing said precipitate with a salt solution of a metal which will form a precipitate with a silicate solution, and adding to the peptized metal metallate a silicate solution, to thereby thoroughly disseminate the metal metallate and precipitated metal silicate throughout the mass, and removing the water, to produce a homogeneous catalyst.

2. The method of producing a catalyst, consisting in peptizing the vanadium-type metallate of a metal other than an alkali metal with an excess of solution of the salt of a metal which will form a precipitate with a silicate solution, combining the product with a silicate solution, and drying.

3. The method of producing a catalyst, consisting in producing a precipitate from a vanadium-type metallate by the addition thereto of a solution of the salt of a metal which forms a precipitate with a silicate solution, peptizing the precipitate in a solution containing the same metal salt, mixing the product with a silicate solution, and drying.

4. The method of producing a catalyst, consisting in peptizing a mixture of a vanadium-type metallate of iron with a solution containing an iron salt, combining the product with a solution of a silicate, and drying.

5. The method of producing a catalyst, consisting in peptizing ferric vanadate with an excess of ferric chloride, mixing with a soluble silicate solution, and drying.

In testimony whereof I hereby affix my signature.

HARRY N. HOLMES.